Figure 1:
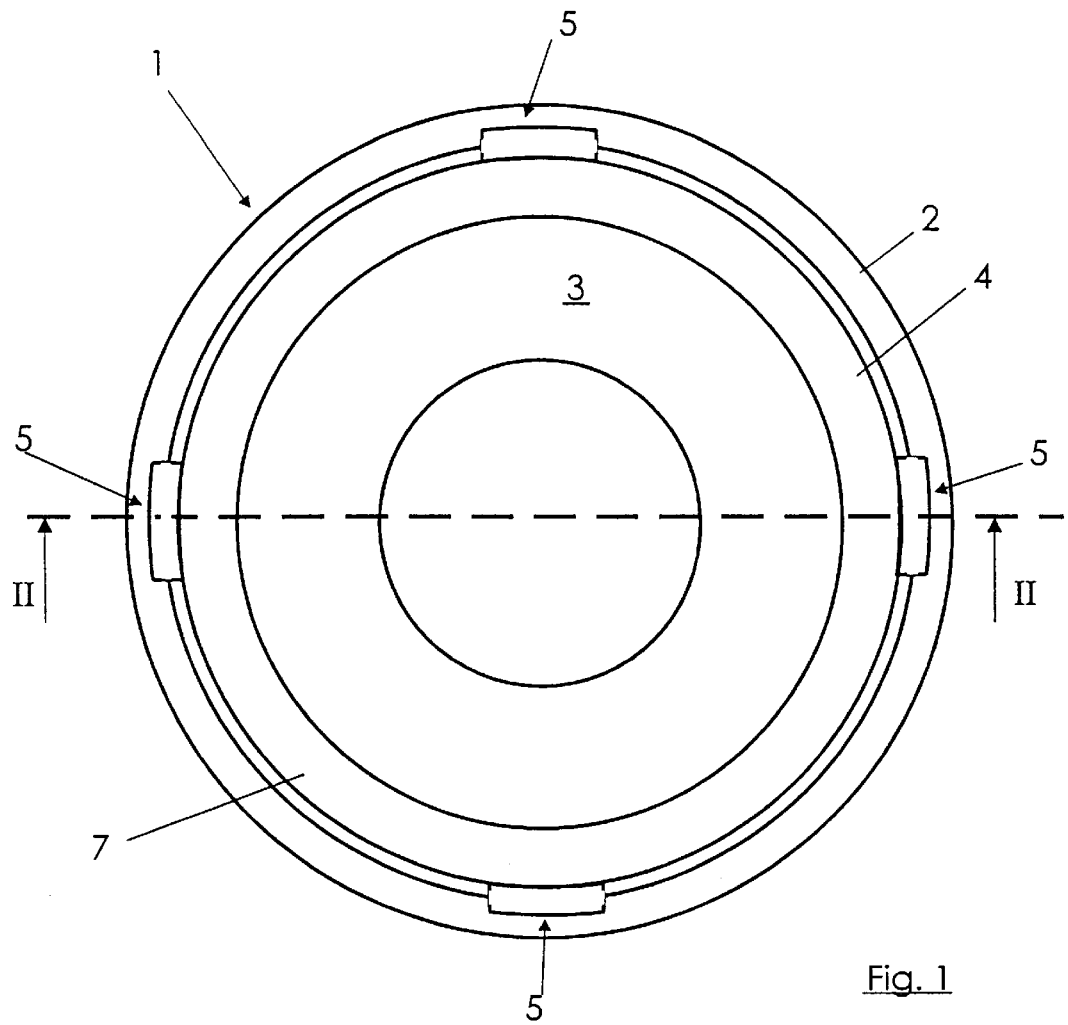

United States Patent
Gaspary

[19]
[11] Patent Number: 6,089,187
[45] Date of Patent: Jul. 18, 2000

[54] DEVICE FOR RECEIVING FOOD FOR ANIMALS

[76] Inventor: Dietrich Gaspary, Ellwanger Strasse 21, D-89522 Heidenheim, Germany

[21] Appl. No.: 09/133,789

[22] Filed: Aug. 12, 1998

[51] Int. Cl.[7] .............................. A01K 5/00; A01K 7/00
[52] U.S. Cl. ........................ 119/61; 119/51.01; 119/72
[58] Field of Search .................. 119/51.01, 72, 119/61; 220/23.87, 23.89

[56] References Cited

U.S. PATENT DOCUMENTS

| | | | |
|---|---|---|---|
| 144,343 | 11/1873 | Martin | 220/592.15 |
| 1,073,857 | 9/1913 | Johnson | 119/61 |
| 1,840,616 | 1/1932 | Burke | 220/23.89 |
| 1,869,901 | 8/1932 | Fever | 119/61 |
| 3,455,280 | 7/1969 | Keene | 119/61 |
| 3,527,192 | 9/1970 | Ferrara | 119/61 |
| 5,031,575 | 7/1991 | Phillips | 119/61 |
| 5,232,117 | 8/1993 | Hale | 220/404 |
| 5,445,110 | 8/1995 | Birnie | 119/61 |
| 5,577,461 | 11/1996 | Sebastian et al. | 119/51.5 |
| 5,709,168 | 1/1998 | Walker | 116/61 |
| 5,782,374 | 7/1998 | Walker | 119/61 |
| 5,855,185 | 1/1999 | Scott | 119/61 |

FOREIGN PATENT DOCUMENTS

| | | | |
|---|---|---|---|
| 3033974 | 4/1982 | Germany | 119/61 |
| 6702 | 4/1889 | United Kingdom | 119/61 |
| 1401617 | 7/1975 | United Kingdom | 119/61 |

*Primary Examiner*—Michael J. Carone
*Assistant Examiner*—Son T. Nguyen
*Attorney, Agent, or Firm*—Andrus, Sceales, Starke & Sawall

[57] ABSTRACT

A device for receiving food for animals, in particular food for household pets, having a basic part, has a stand and a bowl-like cavity shaped for receiving the food, and a bowl-like insert, which can be introduced into the basic part and has an opening and a base. There is provided on the stand of the basic part a fastening arrangement which extends at least over sub-regions of the outer circumference of the basic part and by means of which the insert, which, in the region of the outer circumference of the opening, has a flange-like collar extending at least over sub-regions of the cuter circumference of the opening, can be fastened on the basic part in the region of the collar.

15 Claims, 2 Drawing Sheets

DEVICE FOR RECEIVING FOOD FOR ANIMALS

The invention relates to a device for receiving food for animals which is of the type defined in more detail in the preamble of claim 1.

U.S. Pat. No. 5,445,110 A discloses a device of a generic type which is intended for receiving food for animals and comprises a bowl and a plurality of inserts contained therein. The inserts are fastened on one another by adhesive strips and have a grip hollow by means of which after use, they can easily be drawn out of the bowl and removed from the insert packaging. A weight is provided in the base part of the bowl in order to avoid the situation where the device tips over.

The disadvantage here, however, is that, in the event of the uppermost insert, which is the one in use, being damaged, the insert located therebeneath may be contaminated by the food in the bowl. Furthermore, the small standing surface of the bowl means that it is possible for the latter to tip over during feeding of the household pet.

U.S. Pat. No. 5,577,461 A discloses a two-part feeding-dish set, into one part of which the drinking water can be introduced and into the other part of which a separate feeding dish or bowl can be introduced. The part which is provided for receiving the separate bowl has two concentric cylindrical protrusions. The inner protrusion is provided for receiving the separate bowl, a circular ring being formed between the inner and the outer protrusions, and it being possible for liquids or solids for repelling insects to be introduced into said ring. It is also possible for inserts which consist of recyclable materials to be positioned in separate bowls, cleaning or the separate bowls not being necessary. Once the household pets have been fed, the inserts are disposed of, along with any leftover food, in the household waste.

It is disadvantageous here, however, that the solution described involves high production outlay and, furthermore, there is a danger of the separate bowls slipping out of the mount and of the household pet being able to take in the liquids or solids envisaged for repelling the insects.

The object of the present invention is thus to provide a device for receiving food for animals which is straightforward to produce, has a high degree of stability and can easily be provided with inserts which avoid contamination of the basic part.

This object is achieved according to the invention by the features specified in the defining part of claim 1.

There is advantageously provided on the basic part a fastening arrangement which extends at least over subregions of the outer circumference of the basic part and by means of which the insert can be fastened on the basic part, in order thus to avoid the insert slipping out of the basic part during feeding of the household pet. This avoids the situation where the basic part is contaminated by the food which is to be introduced.

Figure 2:
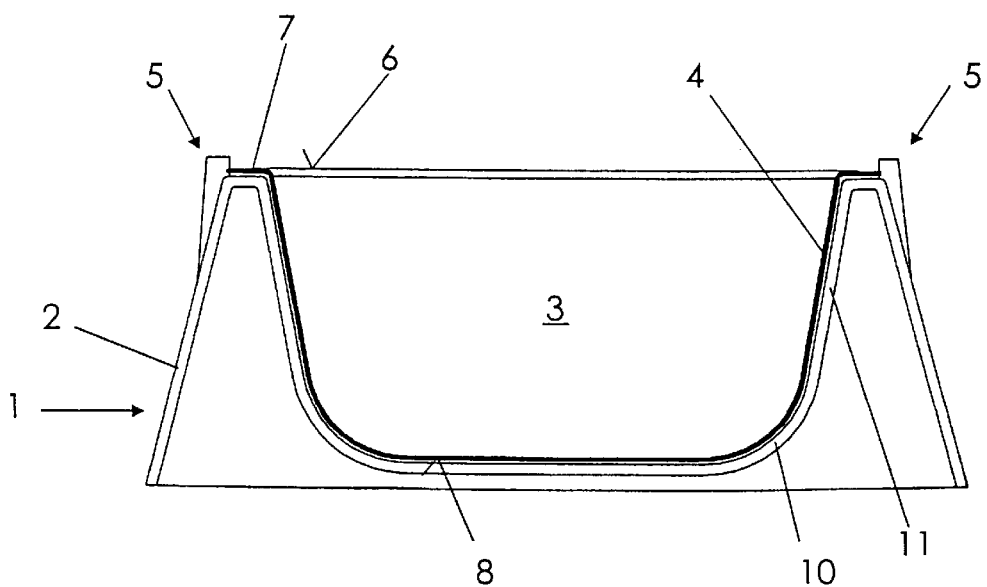
Figure 3:
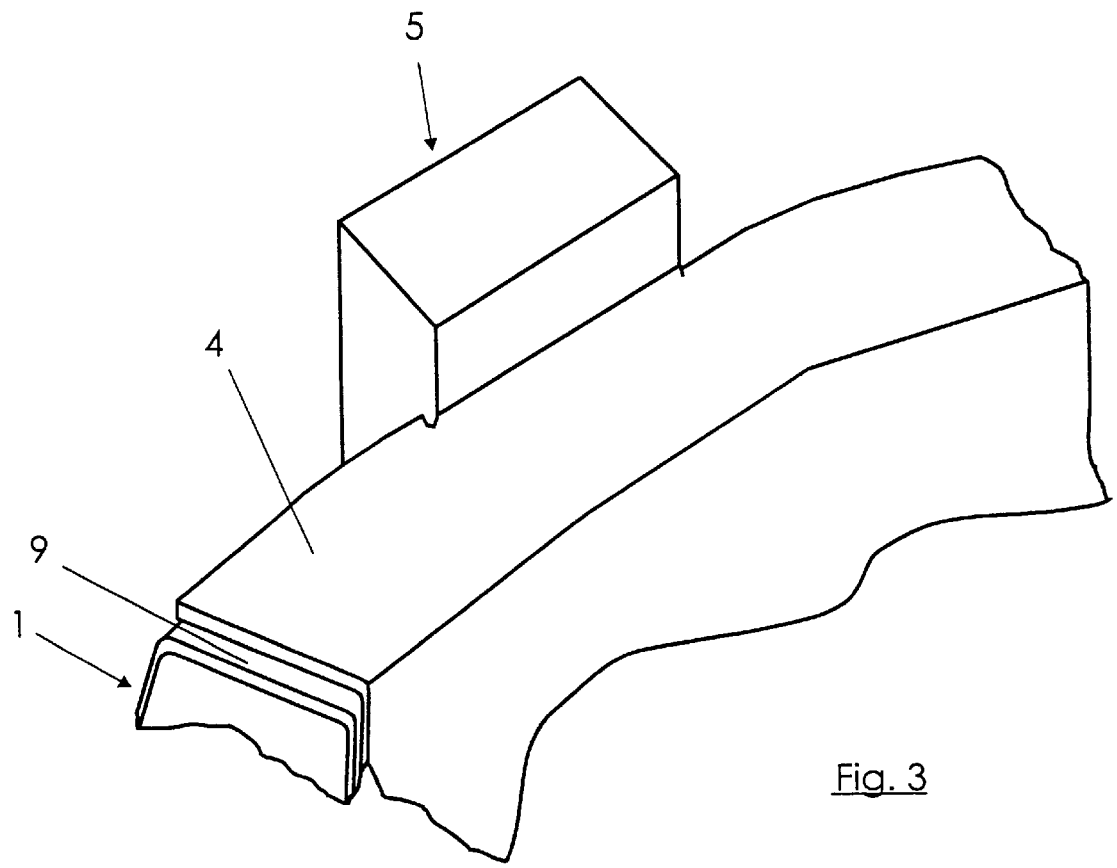
Figure 4:
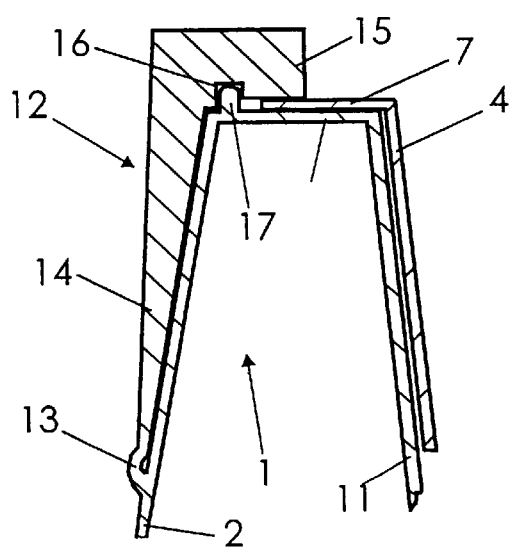

Advantageous configurations and developments of the invention can be gathered from the subclaims and from the exemplary embodiments described in principle again hereinbelow with reference to the drawing in which;

FIG. 1 a shows a plan view of the device;

FIG. 2 shows the device according to FIG. 1 in the section along line II—II;

FIG. 3 a three-dimensional illustration of an arrangement for fastening the device; and FIG. 4 shows a second embodiment of the arrangement for fastening the device.

FIG. 1 illustrates a device for receiving food for animals, in particular food for household pets, having a base part 1, which has a stand 2 and a bowl-like cavity 3 shaped for receiving the food, and an insert 4, which is arranged in the basic part 1.

FIG. 2 illustrates the device according to FIG. 1 in the section along line II—II. Provided on a stand 2 of the basic part 1 is a fastening arrangement 5 which, in the present exemplary embodiment, comprises four elements distributed uniformly over the circumference of the basic part 1. By means of the fastening arrangement 5, the insert 4, which, in the region of an opening 6, has a flange-like collar 7, can be fastened on the basic part 1 in the region of the collar 7.

If an animal is to be fed, then the insert 4 is positioned in the basic part 1, the insert 4 being introduced into the basic part 1 until it butts against the basic part 1 by way of its entire outer surface 8. The collar 7 is pressed onto an annular disk 9 of the basic part 1, said disk being arranged between the stand 2 and the cavity 3, and a clamping action being achieved between the fastening arrangement 5 and the insert 4, Furthermore, the annular disk 9 forms a rest surface for the collar 7 of the insert 4 on the basic part 1.

The clamping action between the insert 4 and the basic part 1 in the region of the elements of the fastening arrangement 5 is produced in that the external diameter of the collar 7 is designed to be larger than the external diameter of the annular disk 9, the elements of the fastening arrangement 5 being arranged on the external diameter of the annular disk 9. This means that, in the region of the elements of the fastening arrangement 5, a pressing zone is formed, by the material excess of the insert 4, such that the insert 4 lifts up front the annular disk 9 in this region and comes to rest on the annular disk 9 again alongside the pressing zone. This means that the insert 4 is secured against being lifted up from the basic part and also against turning with respect to the basic part 1.

In a further configuration of the device, which differs from the present embodiment, it may be provided that the external diameter of the collar 7 is designed to be smaller than the external diameter of the annular disk 9, the fastening arrangement 5 being arranged on a diameter of the annular disk 9 which is designed to be smaller than the external diameter of the collar 7.

As is illustrated in FIG. 2 the stand 2 is designed as a truncated cone which increases its diameter as it extends from the annular disk 9 to that side of the stand 2 which is remote from the annular disk 9. This configuration of the stand 2 provides the basic part 1 with good stability, as a result of which tipping up and thus emptying of the food out of the insert 4 of the basic part 1 are avoided, The cavity 3 is bounded by a trough-like base region 10 and a lateral region 11, the lateral region being designed as a truncated cone whose diameter decreases as it extends from the annular disk 9 to the base region 10.

This formation of the basic part 1 ensures that, in the filled state, the insert 4 is supported by the basic part 1. As a result, the insert 4 can be produced from brittle, biodegradable materials, for example pressed maize or pressed waffle, without it being possible for the insert 4 to be damaged by the dead weight of the food and its function being lost as a result.

Of course, the person skilled in the art may, at his/her discretion, produce the insert 4 from a recyclable material such as waste paper.

FIG. 4 illustrates a further embodiment of the fastening arrangement 5 according to FIG. 3. The fastening arrangement 5 is formed from a clamping part 12 arranged on the outer circumference of the basic part 1, the clamping part being formed integrally with the basic part 1. A flexible connecting point 13 is formed between the clamping part 12 and the basic part 1 and connects the clamping part 12 to the basic part 1 with swing action, The clamping part 12 has a lug 14 and a clamping head 15, it being the case that on its side which is directed toward the annular disk 9, in the region of the lug 14, the clamping head 5 has an aperture 16.

An elevation 17 which, when the clamping part 12 is in swung-in state, engages in the aperture 16 of the clamping head 15 is formed on that side of the annular disk 9 which is directed toward the insert 4.

For the purpose of fastening the insert 4 on the basic part 1, the clamping part 12 is guided over the elevation 17 by way of its clamping head 15 until said elevation latches in the aperture 16 and secures the clamping part 12 against being swung back automatically. In this case, the clamping head 12 is designed such that the collar 7 is arranged or clamped in between the clamping head 15 and the annular disk 9 of the basic part 1, as a result of which the insert 4 is fastened in the basic part 1.

What is claimed is:

1. A device for receiving food for animals, in particular food for household pets, having a basic part, which has a stand, a bowl-like cavity shaped for receiving the food, and an annular disk (9) which is arranged between the stand (2) and the bowl-like cavity (3) and a bowl-like insert, which can be introduced into the basic part and has an opening with an outer circumference, a base, and a flange-like collar (7) at the outer circumference of the opening (6), wherein there is provided on the stand (2) of the basic part (1) a fastening arrangement (5) which extends at least over a portion of an outer circumference of the basic part (1) and by means of which the insert (4) can be fastened on the basic part (1) in the region of the collar (7) as the collar (7) extends at least over the portions of the outer circumference of the basic part (1) beneath the fastening arrangement (5).

2. The device as claimed in claim 1, wherein the insert (4) butts against the basic part (1) by way of its entire outer surface (8).

3. The device as claimed in claim 1, wherein the annular disk (9) is provided on the basic part (1) as a rest for the collar (7) of the insert (4).

4. The device as claimed in claim 1, wherein an external diameter of the collar (7) is designed to be larger than an external diameter of the annular disk (9), the fastening arrangement (5) being arranged on the external diameter of the annular disk (9).

5. The device as claimed in claim 3, wherein an external diameter of the collar (7) is designed to be smaller than an external diameter of the annular disk (9), the fastening arrangement (5) being arranged on a section of the annular disk (9) having a diameter which is smaller than the external diameter of the collar (7).

6. The device as claimed in claim 1, wherein the stand (2) is designed as a truncated cone which increases its diameter as it extends from the annular disk (9) to that side of the stand (2) which is remote from the annular disk (9).

7. The device as claimed in claim 1, wherein the cavity (3) is bounded by a trough-like base region (10) and a lateral region (11), the lateral region (11) being designed as a truncated cone whose diameter decreases as it extends from the annular disk (9) to the base region (10).

8. The device as claimed in claim 1, wherein the insert (4) is made of a recyclable material.

9. The device as claimed in claim 1, wherein the insert (4) is made of a biodegradable material.

10. The device as claimed in claim 1, wherein the fastening arrangement (5) is formed from at least one clamping part (12) arranged an the outer circumference of the basic part (1).

11. The device as claimed in claim 10, wherein the clamping part (12) is formed integrally with the basic part (1).

12. The device as claimed in claim 10, wherein a flexible connecting point (13) is formed between the clamping part (12) and the basic part (1) and connects the clamping part (12) to the basic part (1) with swing action.

13. The device as claimed in claim 10, wherein the clamping part (12) has a lug (14) and a clamping head (15), the clamping head (15) having an aperture (16) adjacent the annular disk (9) into which the elevation (17) of the annular disk (9) can be introduced.

14. The device as claimed in claim 1, wherein the clamping head (15) is designed such that, when the clamping part (12) is in the swung-in state, the collar (7) is arranged between the clamping head (15) and the basic part (1).

15. The device as claimed in claim 1, wherein an elevation (17) which extends at least over a portion of an external diameter of the annular disk (9) is formed on that side of the annular disk (9) which is directed toward the insert (4).

* * * * *